(12) United States Patent
Iwasaki et al.

(10) Patent No.: US 10,259,407 B2
(45) Date of Patent: Apr. 16, 2019

(54) VEHICULAR POWER CONTROL SYSTEM, WIRE HARNESS, AND VEHICULAR POWER CONTROL DEVICE

(71) Applicant: Yazaki Corporation, Tokyo (JP)

(72) Inventors: Katsuyuki Iwasaki, Makinohara (JP); Hideaki Masui, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 373 days.

(21) Appl. No.: 14/834,996

(22) Filed: Aug. 25, 2015

(65) Prior Publication Data

US 2016/0059807 A1 Mar. 3, 2016

(30) Foreign Application Priority Data

Aug. 26, 2014 (JP) ................................. 2014-171509

(51) Int. Cl.
*B60R 16/03* (2006.01)

(52) U.S. Cl.
CPC ................... *B60R 16/03* (2013.01)

(58) Field of Classification Search
CPC .................................................... B60R 16/03
USPC ............................................... 307/10.1–10.8
See application file for complete search history.

(56) References Cited

U.S. PATENT DOCUMENTS

| | | | | |
|---|---|---|---|---|
| 4,956,561 A | * | 9/1990 | Tamer .................. | H01R 13/665 174/541 |
| 5,856,711 A | * | 1/1999 | Kato ...................... | H02H 3/087 307/10.6 |
| 6,144,110 A | * | 11/2000 | Matsuda ................... | H02J 9/04 307/10.1 |

(Continued)

FOREIGN PATENT DOCUMENTS

| | | |
|---|---|---|
| CN | 1402101 A | 3/2003 |
| CN | 1828560 A | 9/2006 |

(Continued)

OTHER PUBLICATIONS

Office Action dated Aug. 22, 2017 issued by the Japanese Patent Office in counterpart Japanese Patent Application No. 2014-171509.

(Continued)

*Primary Examiner* — Daniel Kessie
*Assistant Examiner* — Terrence R Willoughby
(74) *Attorney, Agent, or Firm* — Sughrue Mion, PLLC

(57) ABSTRACT

A vehicular power control system for supplying electric power from a power source of a vehicle to respective ones of a plurality of loads or electronic control units is provided. The vehicular power control system includes a power distribution unit, a customized information storing unit and a power control unit. The power distribution unit receives the electric power and distributes the electric power to a plurality of systems. The customized information storing unit stores customized information in which operation specifications of the plurality of loads or electronic control units are (Continued)

determined. The power control unit controls distribution of electric power to the respective ones of the plurality of loads or electronic control units by the power distribution unit, on the basis of the operation specifications determined in the customized information.

10 Claims, 5 Drawing Sheets

(56) References Cited

U.S. PATENT DOCUMENTS

| | | | | |
|---|---|---|---|---|
| 8,565,962 | B2* | 10/2013 | Yoshiyama | G05B 19/0426 307/10.1 |
| 2003/0033067 | A1 | 2/2003 | Arita et al. | |
| 2006/0200276 | A1 | 9/2006 | Sayama et al. | |
| 2008/0093924 | A1* | 4/2008 | Matsumoto | G01R 31/006 307/10.1 |
| 2009/0234531 | A1 | 9/2009 | Sayama et al. | |
| 2014/0047299 | A1 | 2/2014 | Ikeda | |
| 2015/0025704 | A1 | 1/2015 | Horihata | |
| 2015/0210232 | A1* | 7/2015 | Kanzaki | B60R 16/033 701/36 |

FOREIGN PATENT DOCUMENTS

| | | |
|---|---|---|
| CN | 103577332 A | 2/2014 |
| JP | 7-36574 A | 2/1995 |
| JP | 2002-51430 A | 2/2002 |
| JP | 2003-65145 A | 3/2003 |
| JP | 2003-175781 A | 6/2003 |
| JP | 2003-220908 A | 8/2003 |
| JP | 2004-56944 A | 2/2004 |
| JP | 2008-49982 A | 3/2008 |
| JP | 2008-101590 A | 5/2008 |
| JP | 2009-83789 A | 4/2009 |
| JP | 2011-207384 A | 10/2011 |
| JP | 2013-192108 A | 9/2013 |

OTHER PUBLICATIONS

Communication dated Apr. 5, 2017 by the State Intellectual Property Office of P.R. China in counterpart Chinese Application No. 201510530782.4.

Communication dated Mar. 27, 2018 by the State Intellectual Property Office of the P.R. China in counterpart Chinese Application No. 201510530782.4.

Communication issued by the Japanese Patent Office dated Feb. 6, 2018 in counterpart Japanese Patent Application No. 2014-171509.

Communication dated Oct. 24, 2017 by the State Intellectual Property Office of the P.R. China in counterpart Chinese Application No. 201510530782.4.

Communication dated Sep. 21, 2018, from the State Intellectual Property Office of People's Republic of China in counterpart Application No. 201510530782.4.

* cited by examiner

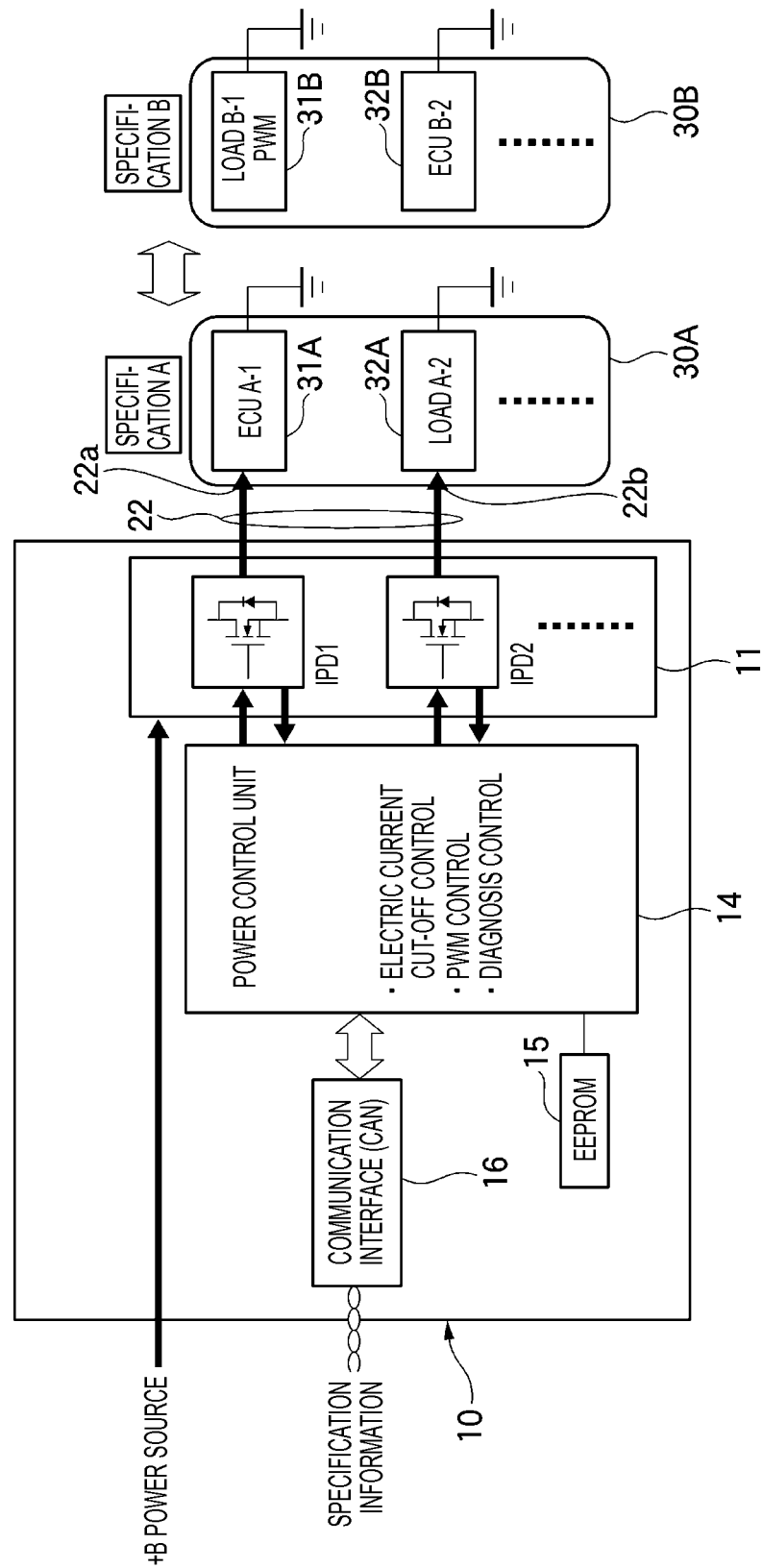

VEHICULAR POWER CONTROL SYSTEM, WIRE HARNESS, AND VEHICULAR POWER CONTROL DEVICE

BACKGROUND

The present invention relates to a vehicular power control system, a wire harness, and a vehicular power control device that distribute electric power from a power source to a plurality of predetermined loads or respective electronic control units on a vehicle.

In vehicles, various electrical devices and ECUs are arranged in a state where these are dispersed in various places on a vehicle body. For example, electrical devices relating to the traveling of a vehicle, electrical devices relating to an audio system, electrical devices relating to the functions of the vehicle body, and the like are arranged. As respective ones of such electrical devices, generally, various switches, various sensors, various loads, control units, and the like are mounted. It is necessary to supply electric power to such various electrical devices and ECUs from a main power source on a vehicle side (a vehicle-mounted battery and an alternator).

In a power distribution system for vehicles disclosed in Patent Document 1, a plurality of electrical connection boxes are provided in order to distribute electric power. Additionally, the inside of an electrical connection box is equipped with a number of fuses or relays.

Additionally, in a vehicle-mounted system disclosed in Patent Document 2, whether or not electric power is supplied is determined on the basis of the state of a power source, and the amount of power supply to a load when an electric power supply side has received a demand for power supply to the load. This prevents the residual amount of the power source from falling below a minimum necessary amount.

[Patent Document 1] JP-A-2004-56944
[Patent Document 2] JP-A-2008-49982

SUMMARY

An object thereof is to provide a vehicular power control system, a wire harness, and a vehicular power control device that do not need to prepare a plurality of types of electrical connection boxes having different circuit configurations by supposing combinations of the types and specifications of vehicles.

According to one of advantageous aspects of the present invention, there is provided a vehicular power control system for supplying electric power from a power source of a vehicle to respective ones of a plurality of loads or electronic control units, the vehicular power control system comprising:

a power distribution unit that receives the electric power and distributes the electric power to a plurality of systems;

a customized information storing unit that stores customized information in which operation specifications of the plurality of loads or electronic control units are determined; and a power control unit that controls distribution of electric power to the respective ones of the plurality of loads or electronic control units by the power distribution unit, on the basis of the operation specifications determined in the customized information.

The power control unit may control values of distribution voltages to the respective ones of the plurality of loads or electronic control units, on the basis of the operation specifications determined in the customized information.

The power control unit may select ON/OFF signals or PWM signals as load driving signals to the respective ones of the plurality of loads or electronic control units, on the basis of the operation specifications determined in the customized information.

The power control unit may specify limiting thresholds of electric currents or voltages to the respective ones of the plurality of loads or electronic control units, on the basis of the operation specifications determined in the customized information, and when occurrence of an abnormality has been detected in accordance with comparison results between the limiting thresholds and the measurement values of the electric currents or the voltages to the respective ones of the plurality of loads or electronic control units, the power control unit may control so as to cut off distribution of electric power to a corresponding one of the loads or the electronic control units.

The power distribution unit may include semiconductor switches.

The power control unit may include a data communication function of performing a data communication between the electronic control units, and rewrites the customized information stored by the customized information storing unit, in accordance with the operation specifications notified from the electronic control units.

According to another advantageous aspect of the present invention, there is provided a wire harness for supplying electric power from a power source of a vehicle to respective ones of a plurality of loads or electronic control units, the wire harness comprising:

a power distribution unit that receives the electric power and distributes the electric power to a plurality of systems;

a customized information storing unit that stores customized information in which operation specifications of the plurality of loads or electronic control units are determined; and a power control unit that controls distribution of electric power to the respective ones of the plurality of loads or electronic control units by the power distribution unit, on the basis of the operation specifications determined in the customized information.

According to another advantageous aspect of the present invention, there is provided a vehicular power control device for supplying electric power from a power source of a vehicle to respective ones of a plurality of loads or electronic control units, the vehicular power control system comprising:

a power distribution unit that receives the electric power and distributes the electric power to a plurality of systems;

a customized information storing unit that stores customized information in which operation specifications of the plurality of loads or electronic control units are determined; and a power control unit that controls distribution of electric power to the respective ones of the plurality of loads or electronic control units by the power distribution unit, on the basis of the operation specifications determined in the customized information.

BRIEF DESCRIPTION OF DRAWINGS

FIG. 5 is a block diagram illustrating the configuration example of the vehicular power control system of the embodiment of the invention.

DETAILED DESCRIPTION OF EXEMPLIFIED EMBODIMENTS

Conventionally, different types of various vehicles are manufactured by makers who manufacture vehicles. Additionally, specifications required of vehicles vary, for example, in accordance with differences between vehicle sale places (destinations). Additionally, the specifications of respective vehicles may vary in accordance with end user's needs. If the types or specifications of respective vehicles vary, the types of electrical devices and ECUs to be mounted, the number of electrical devices and ECUs to be mounted, the functions and specifications of the respective electrical devices and ECUs, and the like also vary.

In this way, if the respective electrical devices and ECUs to be mounted on a vehicle vary, a power distribution system should be constructed in line with the electrical devices and the ECUs. In the related art, in order to construct such a power distribution system, in the power distribution system described in Patent Document 1, a technique of preparing a plurality of types of electrical connection boxes having different circuit configurations and mounting the electrical connection boxes having circuit configurations according to the types and specifications of respective vehicles on a vehicle is adopted.

However, in the above technique, a plurality of types of electrical connection boxes having different circuit configurations should be prepared by supposing the combinations of the types and specifications of vehicles that can be selected by end users. For this reason, the more the number of the combinations increases, the more the types of electrical connection boxes that should be prepared increase.

The present invention has been made in view of the above-described circumstances, and an object thereof is to provide a vehicular power control system, a wire harness, and a vehicular power control device that do not need to prepare a plurality of types of electrical connection boxes having different circuit configurations by supposing combinations of the types and specifications of vehicles.

<Description of Configuration>
<Configuration Example of Electrical System of Entire Vehicle>

Figure 3:
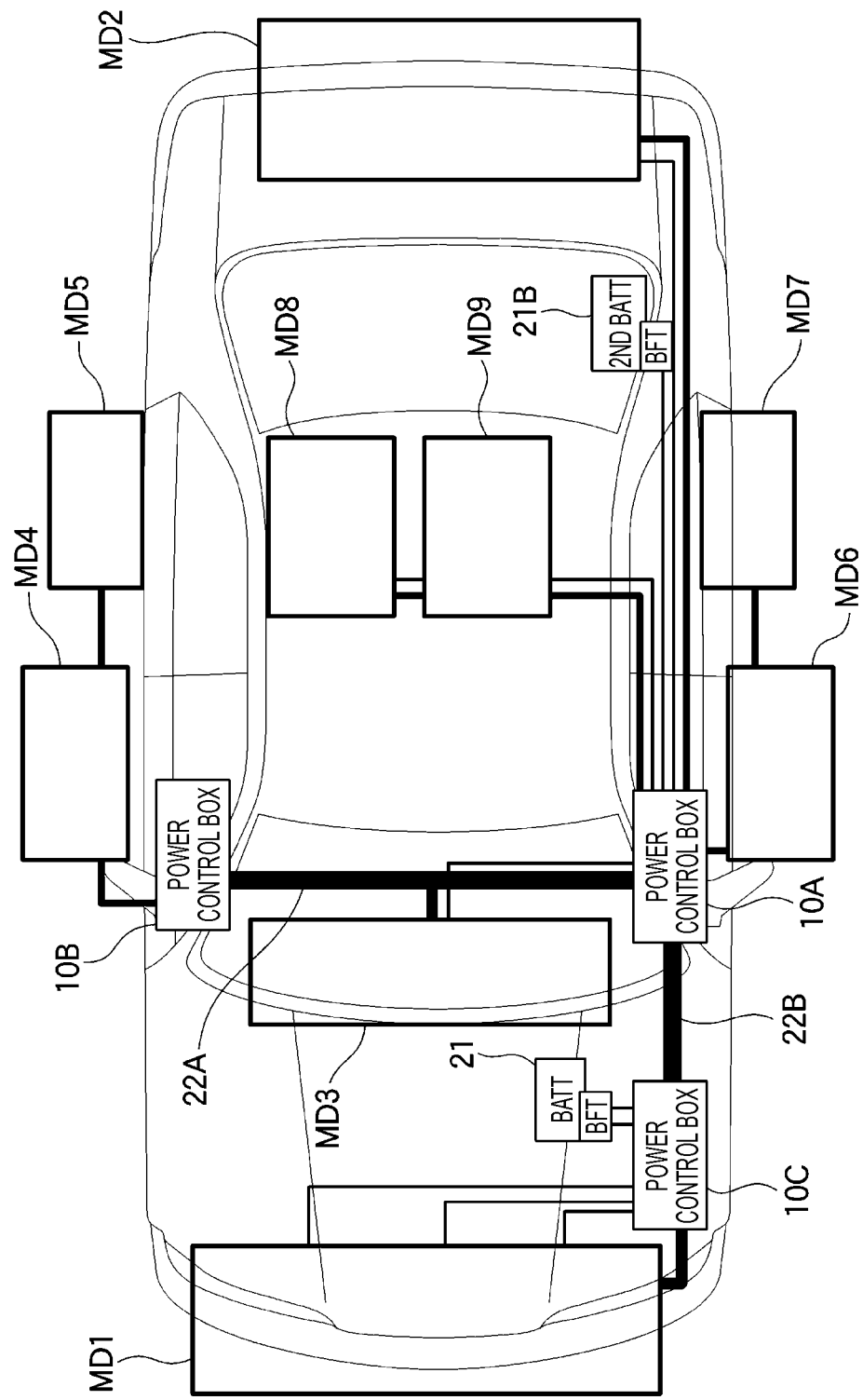
FIG. 3 is a view illustrating a specific example of the positional relationship between various loads, the main power control box, and the sub power control box on a vehicle.

A specific example of the positional relationship between various loads, a main power control box, and a sub power control box on a vehicle is illustrated in FIG. 3. In addition, FIG. 3 illustrates the positional relationship between respective elements in a horizontal plane when a vehicle body is looked down at from above.

Various electrical devices are arranged in various regions on the vehicle. These electrical devices are respectively connected under power source devices on the vehicle side as loads. Additionally, as for a number of loads arranged on the vehicle, a plurality of loads are collectively modularized in each region in consideration of the ease of connection between the loads, and the ease of control of the loads.

In the example illustrated in FIG. 3, load modules MD1 to MD9 are mounted on the vehicle. The load module MD1 is an aggregate of a number of loads arranged in the vicinity of a front region of the vehicle body, and includes various lamps, solid state relays, electric motors, and the like. It is possible to connect the various loads under the respective solid state relays.

The load module MD2 is an aggregate of a number of loads arranged in the vicinity of a rear region of the vehicle body, and includes various lamps, solid state relays, electric motors, and the like. The load module MD3 is an aggregate of a number of loads arranged in the vicinity of a dashboard of the vehicle body, and includes various lamps, solid state relays, electric motors, and the like.

The load module MD4 is an aggregate of a number of loads arranged in the vicinity of a right front door of the vehicle body. The load module MD5 is an aggregate of a number of loads arranged in the vicinity of a right rear door of the vehicle body. The load module MD6 is an aggregate of a number of loads arranged in the vicinity of a left front door of the vehicle body. The load module MD7 is an aggregate of a number of loads arranged in the vicinity of a left rear door of the vehicle body. The load module MD8 is an aggregate of a number of loads arranged in the vicinity of the right of a rear seat of the vehicle body. The load module MD9 is an aggregate of a number of loads arranged in the vicinity of the left of the rear seat of the vehicle body.

Additionally, in order to control the various electrical devices on the vehicle, a number of electronic control units (ECUs) are mounted on respective parts of the vehicle if necessary.

It is necessary to supply electric power from the power source devices on the vehicle side to a number of the respective electronic control devices and a number of the respective loads mounted on the vehicle. Additionally, the plurality of electronic control devices need to control the respective loads, respectively, input signals from various sensors and switches, or perform communication between the ECUs. Therefore, the load modules MD1 to MD9, the respective electronic control units, and the respective power source devices are connected to each other via a wire harness constituted of a number of electric wires. Therefore, electric wires for supplying electric power, electric wires for performing input or output of signals, and electric wires for performing data communication are included in this wire harness.

In the configuration of the vehicle illustrated in FIG. 3, a main power control box 10A and sub power control boxes 10B and 10C are provided in order to distribute the electric power from a main power source to supply the electric power to respective electrical components under the main power source. That is, the electric power supplied from the main power source 21 is distributed via at least one of the main power control box 10A and the sub power control boxes 10B and 10C, and is supplied to the respective loads or electronic control units. Additionally, the main power control box 10A and the sub power control boxes 10B and 10C have various control functions built therein, respectively.

The main power source 21 is constituted of a vehicle-mounted battery (BATT) and a vehicle-mounted power generator (alternator). Additionally, in the vehicle illustrated in FIG. 3, a second battery (2ndBATT) is mounted as a spare main power source 21B. The main power control box 10A and the sub power control boxes 10B and 10C distribute the electric power supplied from the main power source 21 and 21B, and supply the electric power to the respective loads and the respective ECUs, respectively.

In the configuration of the vehicle illustrated in FIG. 3, the main power control box 10A and the sub power control box 10B are electrically connected to each other via a trunk cable 22A. Additionally, the main power control box 10A and the sub power control box 10C are electrically connected to each other via a trunk cable 22B. In addition, the trunk cables 22A and 22B can be constituted as a portion of the wire harness and can also be mounted on the vehicle as a special trunk separated from the wire harness.

<Arrangement Example of Main Constituent Elements of Vehicular Power Control System>

The vehicular power control system of the invention is constituted of, for example, the main power control box 10A, the sub power control box 10B, and the trunk cable 22A that are illustrated in FIG. 3. An external appearance regarding a specific arrangement example of these constituent elements is illustrated in FIG. 2.

Figure 2:
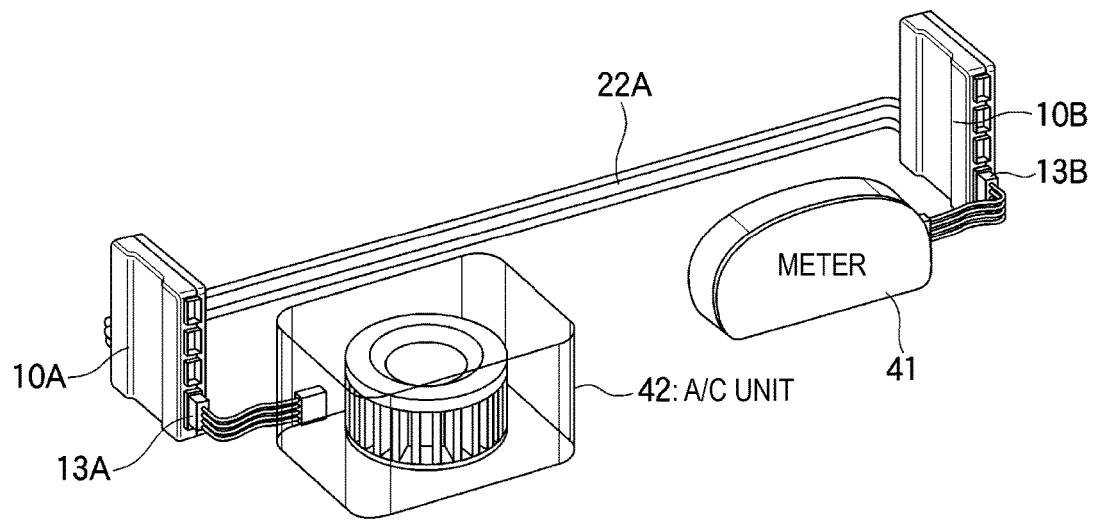
FIG. 2 is a perspective view illustrating a specific arrangement example of a main power control box, a sub power control box, and a trunk cable.

In the example illustrated in FIG. 2, the main power control box 10A is arranged in the vicinity of a left end of the dashboard on the vehicle, and the sub power control box 10B is arranged in the vicinity of a right end of the dashboard. Also, the main power control box 10A and the sub power control box 10B are connected to each other with the trunk cable 22A.

For example, in the case of vehicles in the domestic market in Japan as illustrated in FIG. 2, often, a meter 41 is arranged in a right-side region of the dashboard, and an air-conditioner unit 42 is arranged in a left-side region of a dashboard. Additionally, the meter 41 and the air-conditioner unit 42 have various loads and electronic control devices (ECUs) built therein, respectively.

Therefore, in the configuration example illustrated in FIG. 2, an output-side connector 13A of the main power control box 10A is connected to the air-conditioner unit 42, and the output-side connector 13B of the sub power control box 10B is connected to the meter 41. That is, electric power is supplied from the main power control box 10A to the air-conditioner unit 42, and electric power is supplied from the sub power control box 10B to the meter 41.

In this case, since the distance between the main power control box 10A and the air-conditioner unit 42 is short, it is possible to shorten wiring lines that connect the power control box and the air-conditioner unit. Additionally, since the distance between the sub power control box 10B and the meter 41 is short, it is possible to shorten wiring lines that connect the sub power control box and the meter.

Additionally, when the main power source is at a position near the main power control box 10A, the output of the main power source is connected to the main power control box 10A, and electric power is supplied from the main power source to the main power control box 10A. Then, electric power is supplied to the sub power control box 10B via the main power control box 10A and the trunk cable 22A. In addition, when the main power source is at a position near the sub power control box 10B, the output of the main power source can also be connected to the sub power control box 10B.

<Specific Configuration of Vehicular Power Control System>

Figure 1:
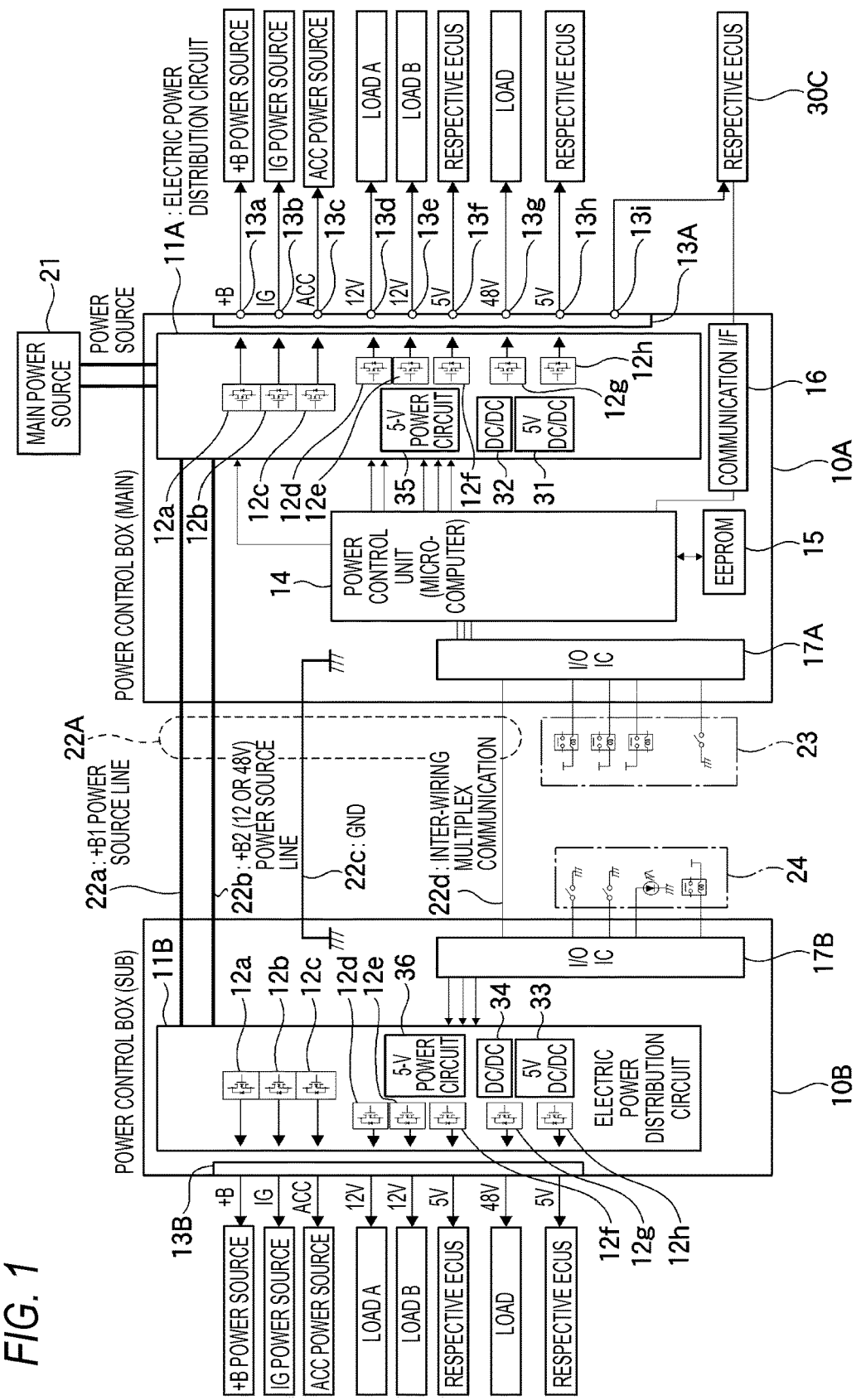
FIG. 1 is a block diagram illustrating a configuration example of a vehicular power control system of an embodiment.

A specific configuration example of the vehicular power control system in the present embodiment is illustrated in FIG. 1. The vehicular power control system illustrated in FIG. 1 includes the main power control box 10A, the sub power control box 10B, and the trunk cable 22A.

The main power control box 10A and the sub power control box 10B respectively have a function of distributing the electric power supplied from the main power source 21 to a plurality of systems and supplying the electric power to the various loads, the electronic control devices (ECUs), and the like, as a basic function. In order to transmit electric power and required signals that are required between the main power control box 10A and the sub power control box 10B, the trunk cable 22A is used to connect these control boxes.

As mentioned above, a +B1 power source line $22a$, a +B2 power source line $22b$, a ground line $22c$, and an inter-wiring communication line $22d$ are included in the trunk cable 22A. Electric power with a voltage of 12 V and 48 V supplied from the main power source 21 is output to the +B1 power source line $22a$ via the main power control box 10A. Additionally, electric power with a voltage of 12 V and 48 V supplied from the spare main power source 21B is output to the +B2 power source line $22b$ via the main power control box 10A.

In the configuration example illustrated in FIG. 1, the main power control box 10A has built therein an electric power distribution circuit 11A, an output-side connector 13A, a power control unit 14, a nonvolatile memory 15, a communication interface (I/F) 16, and an I/O circuit 17A.

The electric power distribution circuit 11A distributes direct-current electric power supplied from the main power source 21 to a required number of the plurality of systems and supplies the electric power after the distribution to an output side, respectively, as a basic function.

Additionally, in order to enable on-off switching of electric power supply to the respective output systems, a number of switching devices $12a$ to $12h$, one or more of which are connected to each system, are provided inside the electric power distribution circuit 11A. The switching devices $12a$ to $12h$ are respectively intelligent power devices (IPDs) constituted of semiconductor circuits, and have various peripheral functions and protective functions built therein. Specifically, a function of detecting an electric current that flows to the output side, gate drivers, and the like are included.

Moreover, DC/DC converters 31, 32 and a 5-V power circuit 35 are built into the electric power distribution circuit 11A. The DC/DC converter 31 has a function of generating output power with a direct-current (DC) voltage of 5 V from direct-current input electric power of 12 V or 48 V. Additionally, the DC/DC converter 32 has a function of generating output power with a direct-current voltage of 48 V from input direct-current electric power of 12 V and generating output power with a direct-current voltage of 12 V from input direct-current electric power of 48 V. The 5-V power circuit 35 has a function of stabilizing a voltage, and can output stable direct-current electric power of 5 V with a relatively small electric current.

Therefore, as for the functions of the electric power distribution circuit 11A, not only the function of simply distributing electric power to the plurality of systems but also a function of performing conversion of a voltage or performing stabilization of a voltage are included. Moreover, output electric currents to the respective systems can be monitored using the switching devices $12a$ to $12h$, and a corresponding output when an abnormality has occurred can also be cut off.

In the main power control box 10A illustrated in FIG. 1, the following electric powers can be respectively output to respective connecting terminals $13a$ to $13i$ of the output-side connector 13A as the output after the distribution of the electric power distribution circuit 11A.

13a: Direct-current electric power "+B" equal to electric power output from main power source 21

13b: Direct-current electric power "IG" turned on/off while interlocking with ignition switch

13c: Direct-current electric power "ACC" turned on/off while interlocking with accessory switch

13d: Direct-current electric power with a capacity of 12 V in which "load A" is required as power source

13e: Direct-current electric power with a capacity of 12 V in which "load B" is required as power source

13f: Stable direct-current electric power of 5 V in which internal circuits of respective ECUs are required as power sources

13g: Direct-current electric power with a capacity of 48 V in which various loads are required as power sources

13h: Stable direct-current electric power of 5 V in which internal circuits of respective ECUs are required as power sources

13i: Stable direct-current electric power of 5 V in which internal circuits of respective ECUs are required as power sources For example, when electric power of 12 V is supplied from the main power source 21, this voltage can be dropped by the DC/DC converter 31, and direct-current electric power with a voltage of 5 V can be output to the connecting terminal 13h. Additionally, power loss during voltage conversion can be suppressed by adopting the DC/DC converter 31. Additionally, when electric power of 12 V is supplied from the main power source 21, this voltage can be raised by the DC/DC converter 32, and direct-current electric power with a voltage of 48 V can be output to the connecting terminal 13g.

In practice, the various loads and the electronic control devices as illustrated in FIG. 3 can be connected to the output-side connector 13A of the main power control box 10A via the wire harness. In this case, since the main power control box 10A outputs voltages of 5 V, 12 V, and 48 V, respectively, optimum voltages suitable for the respective loads, respectively, can be selectively supplied.

The power control unit 14 is constituted of hardware having a microcomputer as a main constituent. By executing programs prepared in advance, the microcomputer of the power control unit 14 realizes functions required for the main power control box 10A, and functions required for controlling the sub power control box 10B connected to the main power control box. For example, by executing a predetermined program, the power control unit 14 can control the respective switching devices 12a to 12h, to supply electric power with predetermined rated voltages to the loads or ECUs connected to the main power control box 10A. Additionally, the power control unit 14 can monitor sense signals from the respective switching devices 12a to 12h to identify the presence/absence of an overcurrent for each output system, and can cut off a corresponding output when the overcurrent is detected. Additionally, the power control unit 14 can perform data communication between the respective ECUs to perform various kinds of information interchange. Moreover, the power control unit 14 can perform transmission of signals via an I/O circuit 17A and the inter-wiring communication line 22d, and can remotely control the sub power control box 10B. The control of the electric power distribution circuit 11A performed by the power control unit 14 of the invention will be described in detail below.

The nonvolatile memory 15 is constituted of an EEPROM and stores various kinds of data required for controlling the power control unit 14. The data stored by the nonvolatile memory 15 can be rewritten if necessary. Customized information stored by the nonvolatile memory 15 of the invention will be described in detail below.

The communication interface 16 provides a communication function of performing data communication between the various ECUs, which are connected to the main power control box 10A, and the power control unit 14. The communication interface 16 has, for example, a communication function corresponding to CAN that is a standard.

The I/O circuit 17A performs signal processing for allowing the power control unit 14 to output and input signals. The I/O circuit 17A is connected to the sub power control box 10B via the inter-wiring communication line 22d of the trunk cable 22A. Therefore, the power control unit 14 can perform multiplex communication with the sub power control box 10B, and can perform exchange of various signals. Additionally, circuits of switches 23 are connected to the I/O circuit 17A. Therefore, the power control unit 14 can input signals input from the switches connected to the I/O circuit 17A, or can control ON/OFF of relays connected to the I/O circuit 17A.

Meanwhile, the sub power control box 10B, as illustrated in FIG. 1, includes an electric power distribution circuit 11B, the output-side connector 13B, and the I/O circuit 17B. The input of the electric power distribution circuit 11B is connected to the main power control box 10A via the +B1 power source line 22a and the +B2 power source line 22b of the trunk cable 22A. Therefore, the electric power output from the electric power distribution circuit 11B is input via the main power control box 10A and the trunk cable 22A.

The electric power distribution circuit 11B has built therein a number of the switching devices 12a to 12h, the DC/DC converters 33 and 34, and the 5-V power circuit 36 other than the basic electric power distribution function. Therefore, ON/OFF of electric power output to respective terminals of the output-side connector 13B can be switched by controlling the switching devices 12a to 12h. However, since the sub power control box 10B does not have built therein the power control unit 14, the electric power distribution circuit 11B has built therein a circuit (not illustrated) that decodes and latches the data transmitted from the power control unit 14 via the inter-wiring communication line 22d. That is, the electric power distribution circuit 11B controls the switching devices 12a to 12h in accordance with the data received from the power control unit 14.

The DC/DC converter 33 has the function of generating output power with a direct-current (DC) voltage of 5 V from direct-current input electric power of 12 V or 48 V. Additionally, the DC/DC converter 34 has the function of generating output power with a direct-current voltage of 48 V from input direct-current electric power of 12 V and generating output power with a direct-current voltage of 12 V from input direct-current electric power of 48 V. The 5-V power circuit 36 has the function of stabilizing a voltage, and can output stable direct-current power of 5 V with a relatively small electric current.

Therefore, as for the functions of the electric power distribution circuit 11B, not only the function of simply distributing electric power to the plurality of systems but also the function of performing conversion of a voltage or performing stabilization of a voltage are included. Moreover, output electric currents to the respective systems can be monitored using the switching devices 12a to 12h, and a corresponding output when an abnormality has occurred can also be cut off.

The I/O circuit 17B performs signal processing for allowing the electric power distribution circuit 11B to output and input signals. The I/O circuit 17B is connected to the main power control box 10A via the inter-wiring communication line 22d. Additionally, circuits of switches 24 are connected to the I/O circuit 17B. Therefore, the electric power distribution circuit 11B can input signals from the switches connected to the I/O circuit 17B, or can control ON/OFF of relays connected to the I/O circuit 17B.

In addition, as for the switches 23 and 24, it is assumed that switches, such as an ignition switch and an accessory switch, relays that drive the load, pilot lamps, and the like are carried.

<Description of Customized Information>

The customized information stored by the nonvolatile memory 15 includes the following information D2, D3, and D4 in respective output systems D1 for distribution output.
D1: Information that identifies output systems
D2: Driving voltages supplied to loads or ECUs
D3: Information on types of load driving signals
D4: Electric current, voltage, or limiting threshold of electric power The driving voltage D2 is information on rated voltages supplied to the loads or the ECUs connected to the main power control box 10A or the sub power control box 10B.

The information D3 on the types of load driving signals includes information from which PWM (pulse width modulation) signals and ON/OFF signals (simple binary signals) can be distinguished from each other. Additionally, in the case of the PWM signals, a pulse width of an ON interval, or a reference value, a lower limit, an upper limit, or the like of duty may be included.

The limiting threshold D4 is information on thresholds used to determine the presence/absence of an abnormality and to protect the main power source 21, the main power control box 10A, the sub power control box 10B, the loads, and the ECUs.

Customized information determined in advance in an initial state when the vehicle is shipped is written in an internal memory of the nonvolatile memory 15. The nonvolatile memory 15 can also rewrite the customized information, and can also be automatically updated by the control of the power control unit 14. In this case, the power control unit 14, for example, obtains customized information via the communication interface (I/F) 16, writes the customized information in the nonvolatile memory 15, or overwrites the customized information on customized information that has already been written.

<Operation of Power Control Unit>

Figure 4:
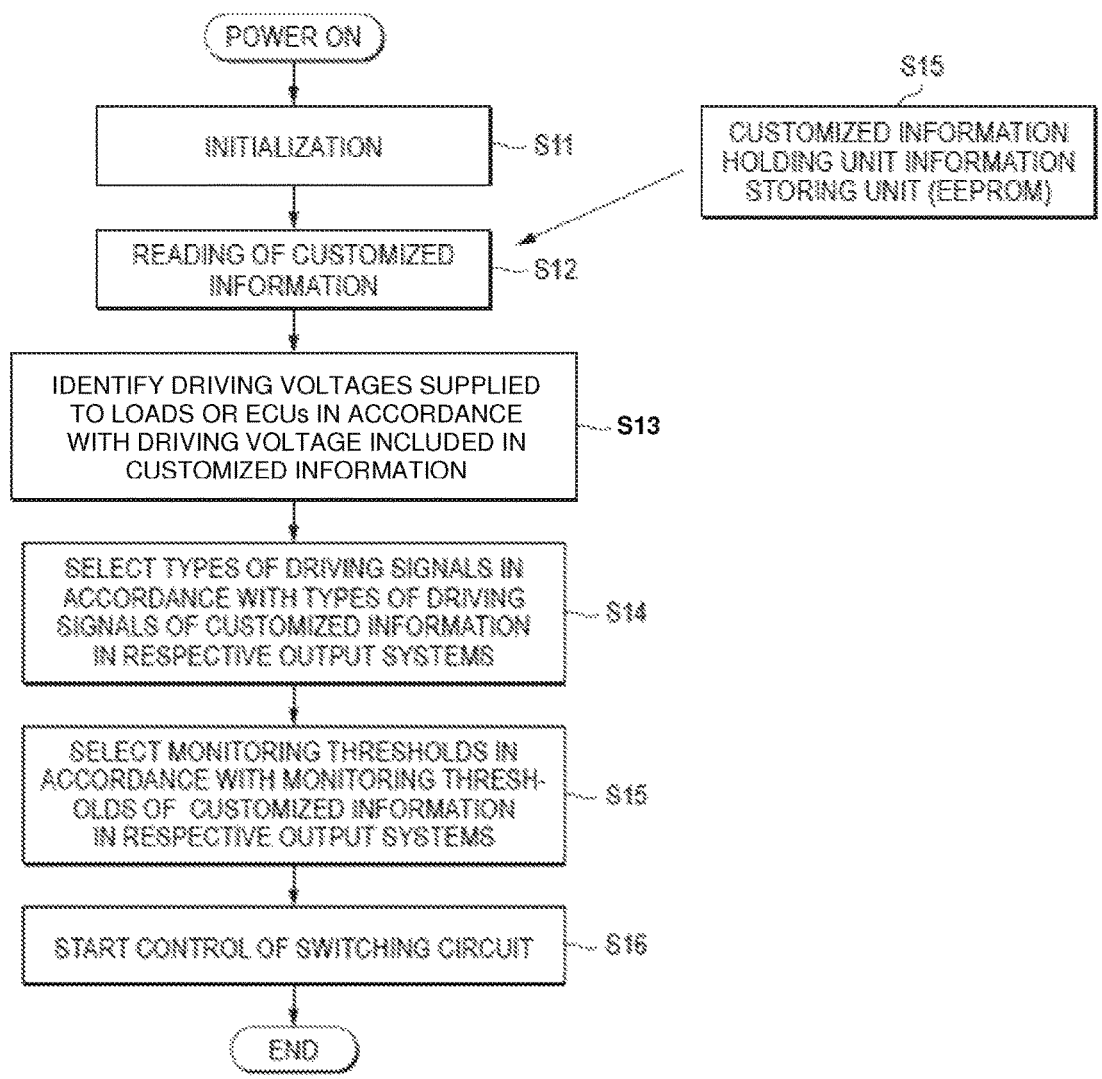
FIG. 4 is a flowchart illustrating communication control regarding the processing of a power control unit.

A main flow regarding the processing of the power control unit 14 is illustrated in FIG. 4. That is, for example, if the ignition switch of the vehicle is turned on, and the supply of electric power from the main power source 21 is started, the power control unit 14 executes processing following Step S12 after initialization of the power control unit itself is performed in First Step S11.

In Step S12, the power control unit 14 executes reading of the customized information stored by the nonvolatile memory 15. That is, the data, such as the aforementioned driving voltage D2, the aforementioned information D3 on the types of the load driving signals, and the aforementioned limiting threshold D4 are acquired from the nonvolatile memory 15 in the respective output systems D1.

In Step S13, the power control unit 14 identifies the driving voltages supplied to the loads or the ECUs connected to the respective output systems D1, in accordance with the driving voltage D2 included in the customized information read in S12. That is, the rated voltages supplied to the loads or the ECUs connected to the respective output systems D1 in Step S13 are determined. The values of the rated voltages determined here are reflected in the contents of processing to be described below.

In Step S14, the power control unit 14 identifies the types of driving signals in the respective output systems D1, in accordance with the information D3 on the types of the load driving signals included in the customized information read in S12. That is, the types of the driving signals supplied to the loads or the ECUs connected to the respective output systems D1, specifically, the "PWM signals" or the "ON/OFF signals" are selected by Step S14. The types of the driving signals selected here are reflected in the contents of the processing to be described below.

In Step S15, the power control unit 14 determines the monitoring thresholds for protecting the loads or the ECUs connected to the respective output systems D1, in accordance with the limiting threshold (D4) included in the customized information read in S12. The monitoring thresholds determined here are reflected in the contents of the processing to be described below.

In Step S16, the power control unit 14 starts the control of the switching circuit 12, on the basis of the information specified in S13 to S15. That is, the power control unit 14 outputs a control signal to the electric power distribution circuit 11A or the electric power distribution circuit 11B so as to supply electric power to the loads or the ECUs connected to the output systems D1, in accordance with the driving voltages identified on the basis of the driving voltage D2 and the types of the driving signals selected on the basis of the information D3 on the types of the load driving signals, in the respective output systems D1. The electric power distribution circuit 11A or the electric power distribution circuit 11B generates PWM signals or ON/OFF signals, using the switching devices 12a to 12h, which converts a voltage input from the main power source 21 into predetermined rated voltages by driving the DC/DC converters 31, 32 and the 5-V power circuit 35, on the basis of the input control signal, or monitors output electric currents to the respective output systems D1, using the switching devices 12a to 12h, on the basis of the input control signal, and cuts off a corresponding output when it is determined that an abnormality has occurred on the basis of the limiting threshold D4.

The configuration of the vehicular power control system of the embodiment of the invention has been described in detail above. As described above, the power control unit 14 refers to the customized information stored by the nonvolatile memory 15, and distribution of electric power to the respective loads or ECUs by the electric power distribution circuit 11A and the electric power distribution circuit 11B, on the basis of operation specifications determined in the customized information. Meanwhile, the electric power distribution circuit 11A and the electric power distribution circuit 11B supply electric power in accordance with the operation specifications determined in the customized information, on the basis of an input control signal, if the control signal is received from the power control unit 14. In the following, the workings of the vehicular power control system of the embodiment of the invention will be described.

<Description of Workings>

A configuration example of the vehicular power control system of the embodiment of the invention is illustrated in FIG. 5. In the vehicular power control system illustrated in FIG. 5, the relationship between the power control box 10 and the electrical devices 30A and 30B is emphasized in the view illustrated in FIG. 1. As illustrated in FIG. 5, it is assumed that either the electrical device 30A with "Specification A" or the electrical device 30B with "Specification B" is connected to the power control box 10 via the wire harness 22.

An electronic control unit (ECU) 31A and loads 32A are included in the electrical device 30A with "Specification A". Additionally, loads 31B and an electronic control unit 32B are included in the electrical device 30B with "Specification B". Additionally, a case where energization of the loads 31B is PWM control is assumed, and a case where energization of the load 32A is ON/OFF control is assumed.

Additionally, when the electrical device 30A with "Specification A" is selected, the electronic control unit 31A is connected to the power source line 22a of the wire harness 22, and the loads 32A are connected to the power source line 22b. Meanwhile, when the electrical device 30B with "Specification B" is selected, the loads 31B are connected to the power source line 22a of the wire harness 22, and the electronic control unit 32B is connected to the power source line 22b.

That is, depending on whether any one of the electrical device 30A and the electrical device 30B is selected, the value of a rated voltage supplied to the power source line 22a, the types (ON/OFF signals/PWM signals) of the driving voltages, and the threshold of an allowable current change. Similarly, the same applies to the electric power supplied to the power source line 22b.

Even in such a situation, the power control unit 14 can cope with to the specification of the electrical device 30A or the electrical device 30B connected to the power control box 10, simply by referring to the customized information. That is, by including the operation specifications for realizing driving of the various electrical devices 30A and 30B in the customized information, switching to electric power supply forms according to selected electrical devices can be performed and electric power can be supplied to the electrical devices, even if a number of candidates for electrical devices capable of being mounted on the vehicle are present. For this reason, the invention can cope with the combinations of the respective electrical devices and ECUs capable of being mounted on the vehicle, using one type of power control box. Therefore, it is unnecessary to prepare a plurality of types of electrical connection boxes having different circuit configurations, supposing the combinations of the types and specifications of vehicles, unlike the related art.

Meanwhile, the power control unit 14 needs to identify the electrical devices connected to the power control box 10. For this purpose, it is assumed that a human being notifies the power control unit 14 of information for identifying the electrical devices connected to the power control box 10. In the present embodiment, a configuration in which a human being notifies the power control unit 14 of the information via the communication interface (I/F) 16 can be realized. Even in such a technique, an effect in which it is possible to cope with the combinations of the respective electrical devices and ECUs capable of being mounted on the vehicle, using one type of power control box can be expected.

Meanwhile, electrical devices in which communication lines are connected to the main power control box 10A via the communication interface (I/F) 16 is present like ECUs 30C illustrated in FIG. 1 among the electrical devices connected to the power control box 10. According to the electrical devices, the power control unit 14 can be notified of the information for identifying the electrical devices themselves. In this way, even if a notification from a human being is not received, the power control unit 14 can identify the electrical devices using the identification information notified from the electrical devices, thereby performing switching to electric power supply forms according to the electrical devices identified from the identification information, and supply electric power to the electrical devices. Since the configuration in which the electrical devices can be automatically identified simply by performing plug-in to the power control box 10 as in this form is useful to make unnecessary the work in which a human being notifies the power control unit 14 of the information for identifying the electrical devices connected to the power control box 10.

Meanwhile, the vehicular power control system illustrated in FIG. 1 has a form in which the electric power distribution circuit 11A, the power control unit 14, and the nonvolatile memory 15 are mounted on the main power control box 10A. The invention is not limited to the form in which the electric power distribution circuit 11A, the power control unit 14, and the nonvolatile memory 15 are mounted on one power control box. In the present embodiment, as for electrical devices and ECUs connected to the sub power control box 10B, switching to electric power supply forms according to the electrical devices and the ECUs can be performed similar to those connected to the main power control box 10A. However, a form may be adopted in which the electric power distribution circuit 11B, the power control unit 14, and the nonvolatile memory 15 may be arranged at separate devices in this way. Moreover, the power control unit 14 may be present as a device that is independent from the power control box, and the nonvolatile memory 15 may be present as a device that is independent from the power control box. In this way, the vehicular power control system in which the electric power distribution circuit 11A, the power control unit 14, and the nonvolatile memory 15 are independently present is obtained from the way of thinking contrary to the way of thinking in which these functional units are housed within the power control box, and it is natural to understand that these functional units are present in somewhere on the wire harness that connects the main power source 21, the electrical devices, and the ECUs. For this reason, the invention can also be regarded as the invention of the wire harness including these functional units.

Here, the features of the embodiment of the vehicular power control system, the wire harness, and the vehicular power control device related to the above-described invention are briefly and collectively listed in the followings (1) to (8), respectively.

(1) Provided is a vehicular power control system for supplying electric power from a power source (main power source 21) of a vehicle to respective ones of a plurality of loads or electronic control units. The vehicular power control system including a power distribution unit (power distribution circuit 11A) that receives the electric power and distributes the electric power to a plurality of systems; a customized information storing unit (nonvolatile memory 15) that stores customized information in which operation specifications of the plurality of loads or electronic control units are determined; and a power control unit (14) that controls distribution of electric power to the respective ones of the plurality of loads or electronic control units by the power distribution unit, on the basis of the operation specifications determined in the customized information.

(2) In the vehicular power control system having the above configuration (1), the power control unit controls values of distribution voltages to the respective ones of the plurality of loads or electronic control units, on the basis of the operation specifications determined in the customized information.

(3) In the vehicular power control system having the above configuration (1), the power control unit selects ON/OFF signals or PWM signals as load driving signals to the respective ones of the plurality of loads or electronic control units, on the basis of the operation specifications determined in the customized information.

(4) In the vehicular power control system having the above configuration (1), the power control unit specifies limiting thresholds of electric currents or voltages to the respective ones of the plurality of loads or electronic control units, on the basis of the operation specifications determined in the customized information, and when occurrence of an abnormality has been detected in accordance with comparison results between the limiting thresholds and the measurement values of the electric currents or the voltages to the respective ones of the plurality of loads or electronic control units, the power control unit controls so as to cut off cut off distribution of electric power to a corresponding one of the loads or the electronic control units.

(5) In the vehicular power control system having any one of the above configurations (1) to (4), the power distribution unit includes semiconductor switches (switching devices 12a to 12h).

(6) In the vehicular power control system having any one of the above configurations (1) to (5), the power control unit includes a data communication function of performing a data communication between the electronic control units, and rewrites the customized information stored by the customized information storing unit, in accordance with the operation specifications notified from the electronic control units.

(7) Provided is a wire harness for supplying electric power from a power source (main power source 21) of a vehicle to respective ones of a plurality of loads or electronic control units. The wire harness includes a power distribution unit (power distribution circuit 11A) that receives the electric power and distributes the electric power to a plurality of systems; a customized information storing unit (nonvolatile memory 15) that stores customized information in which operation specifications of the plurality of loads or electronic control units are determined; and a power control unit (14) that controls distribution of electric power to the respective ones of the plurality of loads or electronic control units by the power distribution unit, on the basis of the operation specifications determined in the customized information.

(8) Provided is a vehicular power control device for supplying electric power from a power source of a vehicle to respective ones of a plurality of loads or electronic control units. The vehicular power control device includes a power distribution unit (power distribution circuit 11A) that receives the electric power and distributes the electric power to a plurality of systems; a customized information storing unit (nonvolatile memory 15) that stores customized information in which operation specifications of the plurality of loads or electronic control units are determined; and a power control unit (14) that controls distribution of electric power to the respective ones of the plurality of loads or electronic control units by the power distribution unit, on the basis of the operation specifications determined in the customized information.

According to the vehicular power control system having the above configuration (1), the operation specifications of the respective ones of the loads or electronic control units are specified depending on the customized information stored by the customized information storing unit, and distribution of electric power to the respective ones of the loads or electronic control units is performed on the basis of the operation specifications. According to this vehicular power control system, a form in which electric power is supplied in accordance with the loads or electronic control units to be connected can be changed. Therefore, it is not necessary to prepare a plurality of types of electrical connection boxes having different circuit configurations by supposing combinations of the types and specifications of vehicles, unlike the related art.

According to the vehicular power control system having the above configuration (2), for example, even if there are loads with different rated voltages as candidates for the electrical devices, the customized information can be referred to, and electric power can be supplied at rated voltages suitable for selected loads.

According to the vehicular power control system having the above configuration (3), for example, even if there are loads such as lamps that require adjustment of electric power and loads such as electric motors that require only switching of ON/OFF as candidates for the electrical devices, the customized information can be referred to, and electric power can be supplied depending on operation specifications suitable for selected loads.

According to the vehicular power control system having the above configuration (4), for example, by setting suitable limiting thresholds corresponding to the differences between the power capacities of the respective electrical devices, the semiconductor switches can be cut off and protected when electric currents or voltages to be supplied to the respective electrical devices exceed the limiting thresholds.

According to the vehicular power control system having the above configuration (5), the semiconductor switches can perform switching at a high speed, perform PWM control, or perform cut-off of an excessive load current at a high speed.

According to the vehicular power control system having the above configuration (6), by identifying the electronic control units using the identification information notified from the electronic control units, switching to electric power supply forms according to the electronic control units identified from the identification information can be performed, and electric power can be supplied to the electronic control units.

According to the wire harness having the above configuration (7), the operation specifications of the respective ones of the loads or electronic control units are specified depending on the customized information stored by the customized information storing unit, and distribution of electric power to the respective ones of the loads or electronic control units is performed on the basis of the operation specifications. According to this wire harness, a form in which electric power is supplied in accordance with the loads or electronic control units to be connected can be changed. Therefore, it is not necessary to prepare a plurality of types of electrical connection boxes having different circuit configurations by supposing combinations of the types and specifications of vehicles, unlike the related art.

According to the vehicular power control device having the above configuration (8), the operation specifications of the respective ones of the loads or electronic control units are specified depending on the customized information stored by the customized information storing unit, and distribution of electric power to the respective ones of the loads or electronic control units is performed on the basis of the operation specifications. According to this vehicular power control device, a form in which electric power is supplied in accordance with the loads or electronic control units to be connected can be changed. Therefore, it is not necessary to prepare a plurality of types of electrical connection boxes having different circuit configurations by supposing combinations of the types and specifications of vehicles, unlike the related art.

According to the vehicular power control system, the wire harness, and the vehicular power control device of the invention, a form in which electric power is supplied in accordance with the loads or electronic control units to be connected can be changed. Therefore, it is not necessary to prepare a plurality of types of electrical connection boxes having different circuit configurations, supposing combinations of the types and specifications of vehicles.

What is claimed is:

1. A vehicular power control system for supplying electric power from a power source of a vehicle to respective ones of a plurality of loads or electronic control units, the vehicular power control system comprising:
    a power distribution unit that receives the electric power and distributes the electric power to the respective ones of the plurality of loads or electronic control units;
    a customized information storing unit that stores customized information that includes operation specifications of the plurality of loads or electronic control units; and
    a power control unit that controls distribution of electric power to the respective ones of the plurality of loads or electronic control units by the power distribution unit, on the basis of the operation specifications of the customized information, wherein
    the power control unit controls values of distribution voltages above zero volts that are supplied to the respective ones of the plurality of loads or electronic control units, on the basis of the operation specifications of the customized information.

2. The vehicular power control system according to claim 1, wherein the power distribution unit further comprises at least one from among a voltage converter circuit and a voltage stabilizing circuit, and
    the electric power flows through the at least one from among the voltage converter circuit and the voltage stabilizing circuit, on the basis of an input control signal supplied by the power control unit to the power distribution unit, such that the power control unit controls the values of the distribution voltages that are supplied to the respective ones of the plurality of loads or electronic control units, on the basis of the operation specifications of the customized information.

3. The vehicular power control system according to claim 1,
    wherein the power control unit identifies and selects types of load driving signals to the respective ones of the plurality of loads or electronic control units, on the basis of the operation specifications of the customized information, the power control unit configured to identify and select the types of load driving signals as ON/OFF signals and PWM signals.

4. The vehicular power control system according to claim 3, wherein the customized information includes information on the types of the load driving signals for supplying to the representative ones of the plurality of loads or electronic control units.

5. The vehicular power control system according to claim 1, wherein the power control unit specifies limiting thresholds of electric currents or voltages to the respective ones of the plurality of loads or electronic control units, on the basis of the operation specifications of the customized information, and
    when occurrence of an abnormality has been detected in accordance with comparison results between the limiting thresholds and the measurement values of the electric currents or the voltages to the respective ones of the plurality of loads or electronic control units, the power control unit controls so as to cut off distribution of electric power to a corresponding one of the loads or the electronic control units.

6. The vehicular power control system according to claim 1, wherein the power distribution unit includes semiconductor switches.

7. The vehicular power control system according to claim 1, wherein the power control unit includes a data communication function of performing a data communication between the electronic control units, and rewrites the customized information stored by the customized information storing unit, in accordance with the operation specifications notified from the electronic control units.

8. The vehicular power control system according to claim 1, wherein the power distribution unit comprises at least one switching circuit, and
    the power control unit controls the at least one switching circuit, on the basis of the operation specifications of the customized information, such that the power control unit controls the values of the distribution voltages that are supplied to the respective ones of the plurality of loads or electronic control units.

9. A wire harness system for supplying electric power from a power source of a vehicle to respective ones of a plurality of loads or electronic control units, the wire harness system comprising:
    a power distribution unit that receives the electric power and distributes the electric power to the respective ones of the plurality of loads or electronic control units;
    a customized information storing unit that stores customized information that includes operation specifications of the plurality of loads or electronic control units; and
    a power control unit that controls distribution of electric power to the respective ones of the plurality of loads or electronic control units by the power distribution unit, on the basis of the operation specifications of the customized information,
    wherein the power control unit controls values of distribution voltages above zero volts that are supplied to the respective ones of the plurality of loads or electronic control units, on the basis of the operation specifications of the customized information.

10. A vehicular power control device for supplying electric power from a power source of a vehicle to respective ones of a plurality of loads or electronic control units, the vehicular power control device comprising:
    a power distribution unit that receives the electric power and distributes the electric power to the respective ones of the plurality of loads or electronic control units and comprises at least one from among a voltage converter circuit and a voltage stabilizing circuit;
    a customized information storing unit that stores customized information that includes operation specifications of the plurality of loads or electronic control units; and
    a power control unit that controls distribution of electric power to the respective ones of the plurality of loads or electronic control units by the power distribution unit, on the basis of the operation specifications of the customized information,
    wherein the power control unit controls values of distribution voltages above zero volts that are supplied to the respective ones of the plurality of loads or electronic control units, on the basis of the operation specifications of the customized information.

* * * * *